Figure 2:
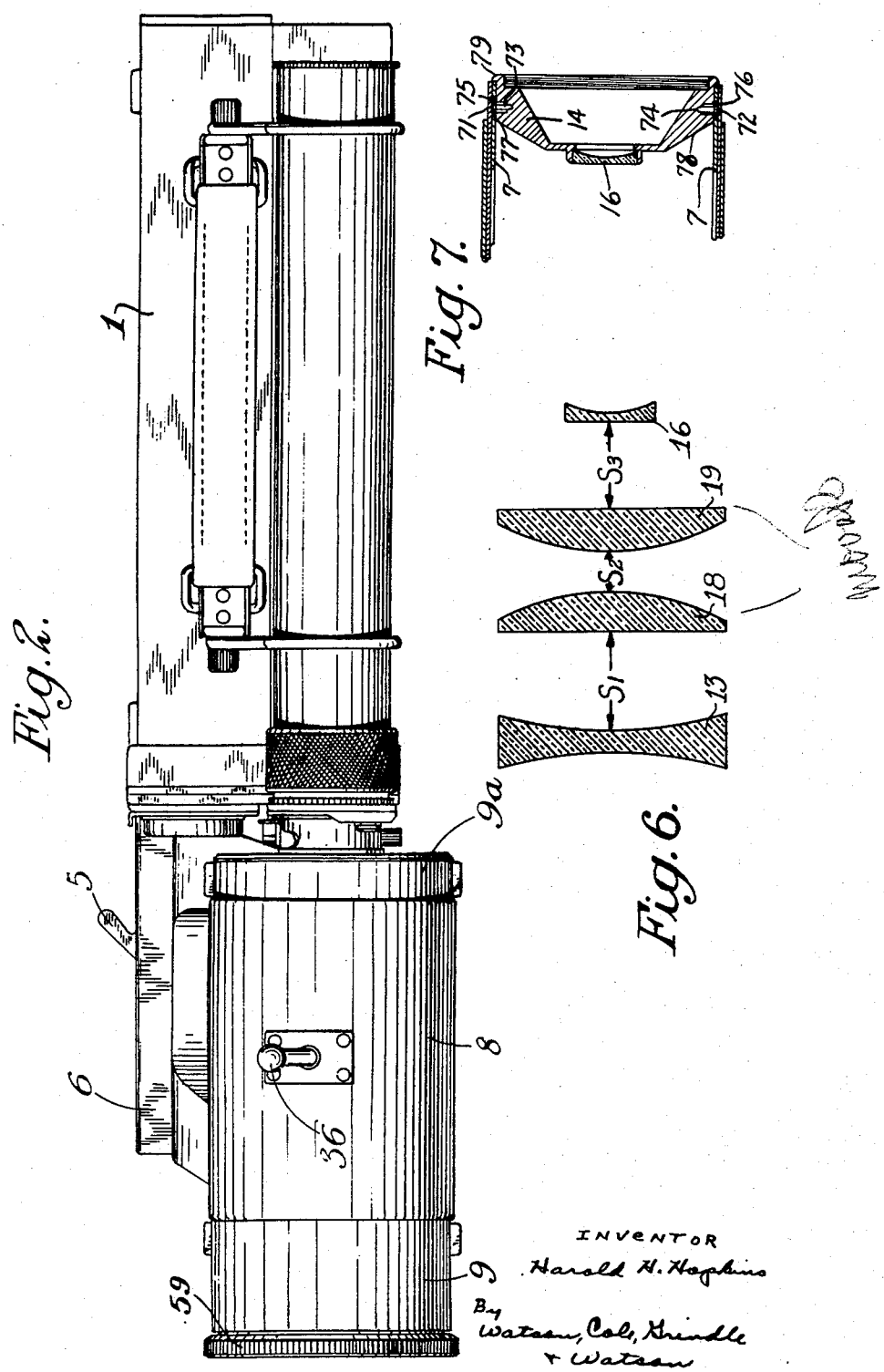

Sept. 4, 1951            H. H. HOPKINS            2,566,889

VARIABLE MAGNIFICATION OPTICAL SYSTEM

Filed Oct. 22, 1948            3 Sheets-Sheet 1

Fig. 1.

INVENTOR
Harold H. Hopkins
By Watson, Cole,
Grindle & Watson

Sept. 4, 1951   H. H. HOPKINS   2,566,889
VARIABLE MAGNIFICATION OPTICAL SYSTEM
Filed Oct. 22, 1948   3 Sheets-Sheet 3

INVENTOR
Harold H. Hopkins
By Watson, Cole, Grindle & Watson

Patented Sept. 4, 1951

2,566,889

UNITED STATES PATENT OFFICE 2,566,889

VARIABLE MAGNIFICATION OPTICAL SYSTEM

Harold Horace Hopkins, London, England, assignor to W. Watson & Sons Limited, London, England, a British company Application October 22, 1948, Serial No. 55,965
In Great Britain November 3, 1947

3 Claims. (Cl. 88—57)

This invention relates to variable magnification optical systems of the kind which may be used alone or in conjunction with a further optical system (e. g. the lens system of a camera) to produce an image of continuously variable size of an object at a fixed distance from the system. Such sytems may be used for example with a stationary cine camera or television transmitting camera in order continuously to increase or decrease the size of the image, on the film or other image receiving device, of objects in the scene towards which the camera is directed and thereby to give the impression when the film is projected, or the television receiver is viewed, that the viewpoint approaches or recedes from the objects in the scene.

Variable magnification optical systems of the above kind include one or more lenses continuously movable over a predetermined range to vary the image size and may also include one or more stationary lenses.

According to the present invention means are provided in a variable magnification system of the above kind whereby one or more of the lenses may be adjusted initially in its position relative to the other lens or lenses to adapt the system for changes in the "fixed" object distance or in the image distance or in both.

The invention is pariculalry but not exclusively concerned with a modification of the form of variable magnification optical systems of the above kind in which the light entering the system passes successively through a front exterior fixed lens, an interior optical system the lens or one or more lenses of which are movable, and a rear exterior fixed lens. Such a system is described for example in copending application No. 55,964, now United States Patent No. 2,501,219, dated March 21, 1950.

In optical systems of the above form as at present constructed or proposed, the nature of the movements imparted to the movable lens or lenses is such as to maintain the image in focus throughout a given range of variation of the image size only when the distance of the object from the system and the distance of the film or other image receiving device from the system remain fixed at values determined by the characteristics of each particular optical system. If it is desired to vary the size of a focussed image of an object at any other object distance a modification of the movements of the movable lens or lenses to produce a similar range of image sizes will, in general, be required.

Further if it is desired to adjust the system to change the image distance or to accommodate changes in any optical devices (such as variation in the distance between the system and a further lens) following the system, modification in the range or law of the movements of the interior movable lens or lenses may be required.

It is inconvenient in practice to provide a number of systems whose movable components have different ranges or laws of movements and it is an object of the invention to provide a variable magnification optical system of the above form by means of which the same law or range of movements of the movable optical lens or lenses of the interior optical system may be employed with a large range of object distances and/or image distances.

The modification of the above form of optical system provided by the invention consists in a variable magnification optical system of the form described in which the position of the appropriate one of the "fixed" exterior lenses is adjustable along its optical axis in order to compensate for a change in the distance of the object or of the image from the system. If desired both of the exterior lenses may be adjustable as aforesaid. The appropriate lens is that nearer to the object or the image of which the distance from the system is changed. In such a system according to the invention the exterior lenses remain fixed while the image size of an object at a fixed distance from the camera is being continuously varied by means of the system and the position of the appropriate exterior lens is adjusted initially to focus the image of the object before the size of the image is varied. The, or each, adjustable exterior lens is preferably carried in a cell which may be moved relative to a body member on which it is supported. The means by which the cell may be moved relative to the body member is preferably of a type which enables fine adjustment of the cell relative to the body and may consist of a screw threaded engagement. In the preferred form of the invention the body member consists of a cylindrical tube, which contains the lenses, and within one end of which the axially adjustable cell slides, the adjustment being effected by means of radial projections from the cell which engage cam faces on the body tube so that as the cell is rotated it is moved axially within the tube.

Figure 3:
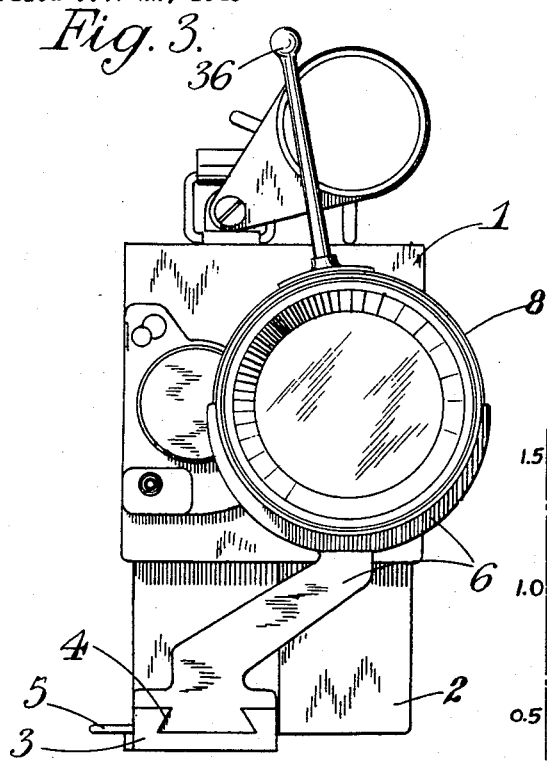
Figure 5:
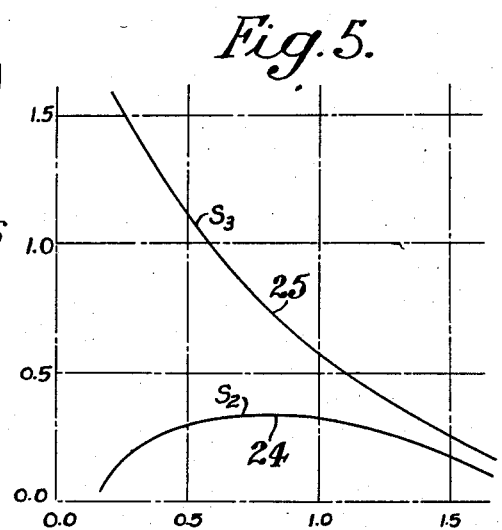
Figure 4:
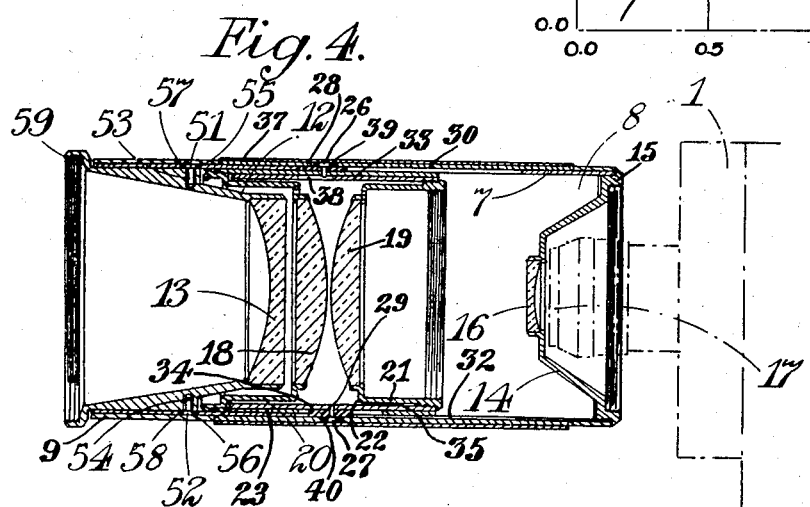

A specific embodiment of the invention will now be described by way of example and with reference to the accompanying drawings, in which:

Figure 1 is a side view of an attachment embodying an optical system according to the invention and fitted to a cine camera, Figure 2 is a plan view of the arrangement shown in Figure 1, Figure 3 is a front view of the same arrangement, Figure 4 is a sectional view of the attachment, with the front part of the cine camera indicated by chain lines, Figure 5 is a graph indicating the nature of the axial movements imparted to the movable lenses in the attachment;

Figure 6 indicates the distances to which the curves of Figure 5 refer; and

Figure 7 is a part sectional view of a modified form of the attachment.

The cine camera 1 is mounted on a base 2 which has a forward extension 3 on which a bracket 6 is carried by means of a dovetail tongue and groove connection 4 lockable by a pivoted key 5. The bracket 6 is attached to each end of the body tube 7 of the attachment 8 (which is as described in copending application No. 55,964) by means of two spacing rings 9, 9a and screws 10. To the front end of the body tube 7 is attached, by means hereinafter described, a cell 12 carrying a negative lens which in this example is a biconcave lens 13 and which constitutes the front fixed negative lens of the system. The body tube 7 carries at its rear end a cell 14 attached to it by a screwthread 15 and carrying a plano-concave lens 16 which is the rear fixed negative lens of the system. The rear lens cell 14 projects inwardly into the attachment and its outer surface surrounds the objective lens carrier 17 of the cine camera 1 and prevents light, other than that which passes through the attachment, from entering the camera.

Two plano-convex lenses 18 and 19 are carried in cells 20 and 21, mounted respectively in a tube 23 and a tube 22, and form the two movable positive members of the system. The tube 22, carrying the rear positive lens 19, slides within the tube 23, carrying the front positive lens 18, and the tube 23 slides within the body tube 7.

The bodily and relative movements which it is necessary to impart to the movable lenses in order to enable the image size to be continuously varied without defocussing may be computed employing the usual methods of calculation from the optical constants of the lenses, the separation of the fixed lenses and like factors. An example of the required movements for a particular combination of lenses is shown in Figure 5, in which the curves 24 and 25 indicate respectively the required relative movements of the two lenses 18 and 19 and the required movement of the lens 19 with respect to the lens 16, as functions of the movement of the lens 18 with respect to the lens 13. The distances S, S₂ and S₃ to which the curves of Figure 5 relate are shown in Figure 6.

The necessary movements are in this example imparted to the lenses 18, 19 by means as described in copending application No. 55,966 of October 22, 1948, now Patent No. 2,537,561, dated January 9, 1951. This means comprises two pins 26 and 27 extending respectively radially outwards from the tubes 23 and 22 and carrying feathers 39 and 40 which engage the sides of curved cam slots 28 and 29 in an outer tube 30 which is carried on the body tube 7 and is partially rotatable thereon about its axis. The lens-carrying tubes 22 and 23 are prevented from rotating and are constrained for axial movement by means of two straight longitudinally extending slots 31 and 32 which are formed in the body tube 7, the sides of which slots engage feathers 33 and 34 carried on the pins 26 and 27 which pass respectively through the two longitudinally extending slots 31 and 32.

The pin 27 also passes through, and the feather 34 lies partly within, a longitudinally extending clearance slot 35 which is formed in the outer movable lens carrying tube 23 and is sufficiently large not to restrict the movements of the pin 27 and the feather 34. A longitudinally extending clearance slot 38 is also provided in the inner movable lens carrying tube 22 to receive a projection, through the inner surface of the tube 23, of the pin 26 without restricting the movement of the pin 26.

The cam slots 28 and 29 in the rotatable tube 30 are so shaped that as the tube 30 is rotated, by means of a handle 36, the feathers 39, 40 and pins 26, 27 travel along the slots 28 and 29 and move the lens carrying tubes 22 and 23, to which they are attached, axially in the manner required. The necessary shapes of the slots 28 and 29 may be calculated from computed curves of the kind shown in Figure 5. The rotatable tube 30 is enclosed within a cover tube 37 which is attached to it and protects the slots 28 and 29 and retains the feathers 39, 40.

The cell 12 carrying the front "fixed" lens 13 slides within the body tube 7 and has two diametrically opposite radially extending short cylindrical pins 51, 52 formed by the heads of cheese headed screws 53, 54 threaded radially into the cell 12. The pins 51, 52 carry respectively feathers 55, 56, which extend for a short distance along and engage the sides of cam slots 57, 58. When the cell 12 is rotated within the body tube 7, by means of the knurled rim 59, the cam slots 57, 58 move it axially together with the lens 13.

In use, the objective lens of the cine camera is adjusted so that it would focus an infinite object if the attachment were not present and subsequent adjustments to correct for changes in object distance are effected by adjusting the position of the front lens 13 of the attachment as described above.

The rear lens 16 may also be arranged to be adjustable axially. In the modification shown in Figure 7 the cell 14 carrying the rear "fixed" lens 16 slides within the body tube 7 and has two diametrically opposite radially extending short cylindrical pins 71, 72 formed by the heads of cheese headed screws 73, 74 threaded radially into the cell 14. The pins 71, 72 carry respectively feathers 75, 76, which extend for a short distance along and engage the sides of cam slots 77, 78. When the cell 14 is rotated within the body tube 7, by means of the knurled rim 79, the cam slots 77, 78 move it axially together with the lens 16.

The invention is not restricted to attachments for cine cameras and may be embodied in any variable magnification optical system of the kind described.

It will be appreciated that the word "lens" is not restricted in its meaning to a simple lens but includes a compound lens comprising two or more component simple lenses in contact or spaced apart by a fixed amount.

I claim:

1. A variable magnification optical system comprising a body portion carrying two normally fixed negative lenses and two movable positive lenses arranged on a common optical axis with the movable positive lenses between and spaced from the two normally fixed negative lenses, at least one of which normally fixed negative lenses is mounted for adjusting movement in the axial direction, magnification-varying mechanical means operable to effect simultaneous movements of the two movable positive lenses, relative to the body and relative to each other, in the axial direction and according to a law such that the distance, from the body, at which the image of an object at a fixed distance from the body is accurately focussed by the system remains constant while the size of the said image is continuously varied during the operation of the magnification-varying means, and initial-adjusting mechanical means, independent of the magnification-varying means and operable, independently of the magnification-varying means, to move the normally fixed negative lens mounted for adjusting movement as aforesaid in the axial direction to effect initial focussing of the system before the magnification-varying means is operated.

2. A variable magnification optical system according to claim 1 wherein both of the normally fixed negative lenses are mounted for adjusting movement as aforesaid and wherein initial-adjusting mechanical means independent of the magnification-varying means, and operable independently of the magnification-varying means, are provided for each of the normally fixed negative lenses.

3. A variable magnification optical system according to claim 1 wherein a support tube, constituting the body, carries the several lenses and wherein the said normally fixed negative lens mounted for adjusting movement is carried in a cell axially movable, and rotatable about the axis, with respect to the support tube between limiting positions, the cell and the support tube thereby constituting two relatively movable parts, and wherein the initial-adjusting means comprise pins on one part engaging in cam slots in the other part to effect axial movement of the cell on relative rotational movement between the two parts.

HAROLD HORACE HOPKINS.

REFERENCES CITED

The following references are of record in the file of this patent:

UNITED STATES PATENTS

| Number | Name | Date |
|---|---|---|
| 696,788 | Allen | Apr. 1, 1902 |
| 1,947,669 | Warmisham et al. | Feb. 20, 1934 |
| 1,950,166 | Durholz | Mar. 6, 1934 |
| 1,988,390 | Naumann | Jan. 15, 1935 |
| 2,184,018 | Ort | Dec. 19, 1939 |
| 2,235,364 | Gramatzki | Mar. 18, 1941 |
| 2,271,227 | Lee | Jan. 27, 1942 |